Figure 3:
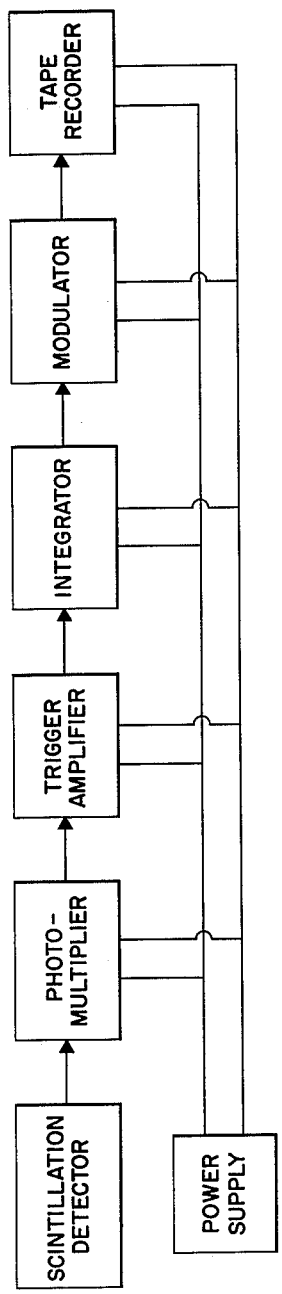

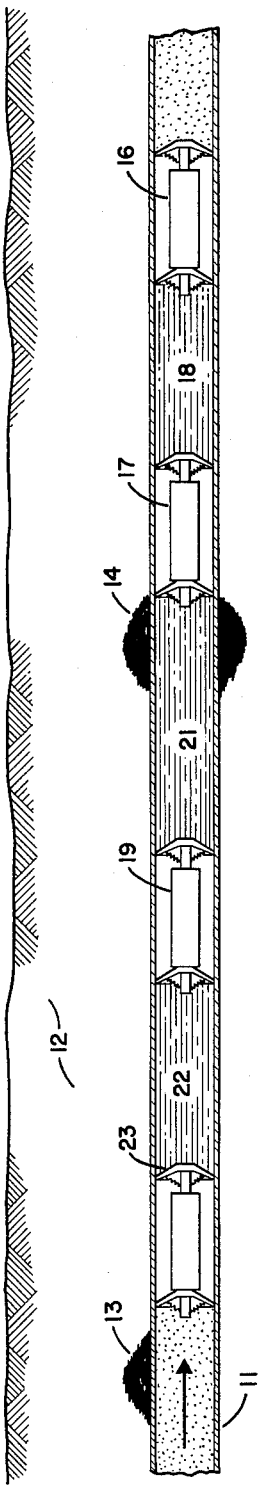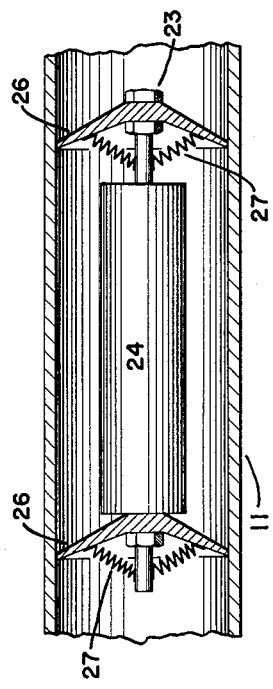

INVENTOR.
PRESTON L. GANT
BY
*Joseph C. Kotarski*
ATTORNEY

United States Patent Office 3,045,116
Patented July 17, 1962

3,045,116
DETECTION AND LOCATION OF PIPELINE LEAKS
Preston L. Gant, Ponca City, Okla., assignor to Continental Oil Company, Ponca City, Okla., a corporation of Delaware
Filed May 11, 1959, Ser. No. 812,317
4 Claims. (Cl. 250—43.5)

This invention relates to methods for detecting and locating leaks in gas-carrying pipelines.

When leaks develop in pipelines carrying liquids, oftentimes such leaks can be detected merely by walking the length of the pipeline and noting the condition of the ground above the line. Leakage of oil may at times be detected by its physical presence above the ground. Underground oil leaks may kill or prevent plant life from growing. This laborious line-walking method has been improved by spotting leaks from low flying aircraft and by the use of various instrumented techniques. However, when gas leaks from a pipeline there is no physical evidence of it in the soil as occurs with oil, and such leaks are difficult to locate.

An object of this invention is to provide a method for detecting and locating leaks in gas-carrying pipelines. Another object is to provide a method which enables detection of virtually all of the leaks in a gas pipeline and which eliminates laborious line walking. A further object is to provide a method which employs radioactive materials and radioactivity detection means for detecting and locating leaks in gas-carrying pipelines. Other objects and advantages of the present invention will be apparent from the detailed description thereof.

The leaks in gas-carrying pipelines are detected and located by a method which contemplates the following: A liquid containing small amounts of radioactive material is introduced into and passed as a slug through the pipeline by means of gas flowing under pressure in the line. The liquid slug preferably fills up a section of the pipeline and passes as a cylindrical piston-like slug therethrough. As this radioactive liquid slug passes by the leak holes in the line, a portion of the liquid leaks through the holes and forms zones of radioactive exterior of the pipeline and adjacent the leaks therein. A radioactivity detection and recording means is subsequently moved, by means of gas flowing under pressure within the line, along the same path as was traveled by the slug of liquid containing the radioactive material. The detection and recording means detects radioactivity exterior of the pipeline, which was caused by leaks in the line, in a manner relatable to distance along the line, and thereby enables the location of such leaks to be determined. The liquid which is flowed through the line may conveniently be a petroleum oil, when the pipeline is being used to transport hydrocarbon gases, or some other liquid such as water.

The liquid containing radioactive material is preferably maintained as a cylindrical piston-like slug. This may be achieved by providing at both ends of the liquid pipeline pigs having sealing means which prevents any substantial amount of liquid from passing around the pigs. The liquid entirely fills the length of pipeline between the pigs and thus assures contact of the liquid with the entire interior circumference of the line as the piston-like radioactive slug passes therethrough. This avoids the problem of liquid falling to the bottom of the pipeline and passing as a film on the bottom which would be ineffective for detecting leaks located in the side and upper portions of the pipeline. Another liquid slug, but which is initially free of radioactive material, may be used to follow behind the radioactive liquid slug to wash radioactive material which tends to cling to the interior wall of the pipeline. The wash slug(s) prevents errors in the leak detection technique. Pipeline pigs having associated sealing means may be used to maintain the wash liquid as a piston-like liquid slug.

Figure 4:
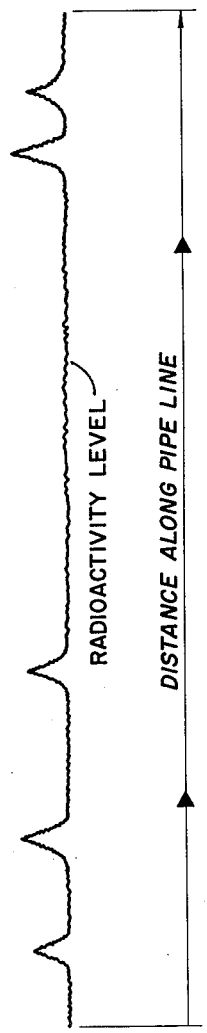

FIGURE 1 shows in schematic form a section of a gas-carrying pipeline in which an embodiment of the leak detection method of this invention is being practiced. FIGURE 2 shows in schematic partial cross section an enlarged view of a section of pipeline and the pipeline pig having the radioactivity detection and recording means. FIGURE 3 illustrates in schematic form various elements which may be employed in the detection and recording apparatus. FIGURE 4 is a schematic representation of a recording of detected radioactivity.

Referring now to FIGURE 1, a gas-carrying pipeline 11 which is buried in ground 12, has leaks therein adjacent zones 13 and 14. The existence, location and size of the leaks are unknown. The gas which is being carried by the pipeline is natural gas, but the invention is equally applicable to lines carrying other hydrocarbon gases, hydrogen, producer, helium or other fixed gases.

The flow of gas in a section of the pipeline is shut off by closing the proper valves. A pipeline pig 16, having sealing means which will be discussed later, is then introduced into this section of pipeline in which the flow of gas has ceased. The pipeline pig may be introduced via an enlarged scraper trap or by cutting an opening in the pipeline. The pig is then forced forward in the pipeline in the normal direction of gas flow. A hydrocarbon oil such as petroleum, either crude oil or any of the refined products therefrom such as gasoline, kerosene, or fuel oil, preferably the latter, is introduced into the pipeline behind pipeline pig 16. The introduced fuel oil contains small amounts of a gamma ray emitting radioactive material. The radioactive material is preferably soluble in the fuel oil. It may be an organic derivative of a radioactive material which preferably has a short half life. For example, derivatives of iodine-131 (which has a half life of 8 days), bromine-82 (which has a half life of 36 hours), or other short half life elements may be employed. The radioactive material is contained in very low concentrations in the fuel oil introduced into the pipeline, e.g., on the order of .01 to 1.0 percent. To illustrate, from 0.1 to 10 grams of radioactive dibromobenzene or ethylenebromide in approximately 0.5 to 5 kilograms of fuel oil provides a usable concentration. The radioactive bromine compound itself has a specific activity on the order of 200 millicuries per gram. When higher specific activity radioisotopes are used, the concentration in the fuel oil may be lowered, in light of the above example, and when using lower specific activity radioisotopes, the concentration thereof in the fuel oil must be proportionally greater. The organic derivative of the radioactive compound should preferably have a very low volatility, preferably of lower than the fuel oil or other liquid being used in the test. Thus, high boiling derivatives, e.g., boiling above 200–300° C. may be used and they are not readily volatilized from the ground adjacent the leak when gas flows therethrough.

The fuel oil containing 0.1 percent of radioactive bromonaphthalene is introduced into the pipeline and forces the pipeline pig 16 forward until a section of pipeline, e.g., 0.1 to 1 mile in length is completely filled with liquid containing radioactive material. After a sufficient amount of the liquid containing the radioactive material is introduced into the line, a second pipeline pig 17 having sealing means is introduced into the pipeline immediately behind liquid. Pipeline pigs 16 and 17 maintain the liquid between them in the form of piston-like radioactive slug 18.

After pipeline pig 17 has been introduced into the pipeline, additional fuel oil is injected into the line under pressure so as to propel pipeline pigs 16 and 17 and piston-like radioactive slug 18 forward in the normal direction of flow of gas in the line. This fuel oil which is free of radioactive material is injected into the line until a section, e.g., 0.1 to 1 mile of the line is filled with the fuel oil. Pipeline pig 19 is then introduced into the line behind the fuel oil. Pigs 17 and 19 thus maintain the liquid fuel oil between them as a cylindrical piston-like slug 21 which can be flowed through the line. This slug serves as a wash liquid which removes and dissolves therein any of the radioactive material that had been left clinging to the interior pipeline wall after radioactive slug 18 had passed by. Additional mounts of fuel oil are then introduced behind pig 19 to form a second wash section 22 of fuel oil immediately behind the first wash section 21. After sufficient fuel oil is introduced to form wash section 22, pipeline pig 23 is inserted in the line behind the wash oil.

Referring to FIGURE 2, pipeline pig 23 has attached thereto an instrument carrier 24 whose components are further illustrated in FIGURE 3. Instrument carrier 24 is of cylindrical shape and capable of withstanding usual pipeline pressure, e.g., 50 to 2500 p.s.i.g. Cups 26 are attached to pipeline pig 23. The cups are made from a tough but flexible material which is resistant to the liquids and gases employed in practicing the invention. The cups may be of hard rubber. They are circular in shape and present a surface which is concave to the direction of flow in the pipeline. Since they are used to form a seal against the inner wall of the pipeline, means are provided which insure a sealing relationship between cups 26 and the interior wall of pipeline 11. In the embodiment shown herein these means consist of expansion springs 27 which constantly force the outwardly extending edge of cups 26 against the interior wall of the pipeline. Cups 26 are subject to some wear during passage of the pig through the pipeline. As the cups 26 wear, the pressure of springs 27 forces the cups to assume an angle, with respect to the interior surface of the pipeline, which is more nearly perpendicular than that shown in FIGURE 2. All of the pigs employed herein, e.g., pigs 16, 17, 19 and 23, have cups 26 and means for compelling the outwardly extending edges of the cups to ride and tightly abut against the interior wall of the pipeline. The residual film of liquid left clinging to the interior wall of the pipeline by liquid sections 18, 21 and 22 provide a measure of lubrication between the outwardly extending edges of cups 26 and the interior wall of the pipeline and thus serve to reduce the amount of wear. With respect to pipeline pig 23, these cups also keep instrument carrier 24 located near the central axis of the pipeline. It is evident that other means may be used which provide a seal so as to prevent the substantial passage of liquids around the individual pipeline pigs. Each pipeline pig may be provided with more than two cups, if desired, to assist in bridging over any valve holes in the pipeline without becoming stuck in the line. It is also desirable to close off later scraper traps or employ pigs of such length that they do not fall into scraper traps; otherwise the test could be disrupted.

Referring again to FIGURE 1, when the piston-like slug of radioactive liquid 18 passes by the leaks in the pipeline, zones of radioactivity 13 and 14 are formed in the ground adjacent the pipeline. The leak in the upper portion of the pipeline forms a zone of radioactivity 13 only about the upper portion of the line, whereas farther along the pipeline a zone of radioactivity 14 entirely surrounds the pipeline adjacent the leak therein. If the liquid containing radioactive material were merely flowing along the bottom of the pipeline, no radioactive liquid would have been expelled through the leak holes in the upper or top portion of the pipeline and such a leak would not have been detected.

FIGURE 4 is a schematic representation of the detection and recording equipment contained inside instrument carrier 24. The scintillation detector (or other suitable means for detecting the external radioactivity) detects the gamma rays emanating from the leaked radioactive material outside the line. The gamma rays impinging upon a sodium iodide crystal detector are converted to flashes of light. The light is reflected into a photomultiplier where it is converted to a direct current of varying magnitude and amplified. The magnitude of the current produced therefrom is proportional to the level of radioactivity in the area detected by the scintillation detector. A trigger amplifier and integrating means are associated with the photomultiplier to provide an indication of the average current for a fixed unit of time, this average current being proportional to the radioactivity detected. This current is then manifested as an E.M.F. by suitable means, i.e., flowing current through a fixed resistor causes an E.M.F. to develop according to the law $E=IR$. The E.M.F. is then modulated onto a carrier frequency which is an integral part of a tape or wire recorder. The results are permanently recorded by conventional means on the tape or wire reel. The recorder is operated at a constant speed, since the pipeline pig will pass through the line at an approximately constant rate which is relatable to the flow rate of the gas forcing the pig through the line. Thus, indications of radioactivity outside the pipeline will be recorded in terms of distance along the pipeline. Odometer means can be used to govern the operating rate of the tape or wire recorder so as to eliminate any errors in the location of the leaks due to pulsation in the rate of flow of gas through the pipeline. After completion of the pipeline test the liquids are passed into storage where the radioactivity is allowed to decay. The pipeline pig 23 is removed from the line and the recording recovered from the instrument carrier. It can then be played back and used to provide a visual record showing radioactivity levels at various points along the length of the pipeline which indicate the locations of leaks.

Such a record is shown in FIGURE 4. Radioactivity is plotted against distance along the line. The recorded radioactivity along the outside of the pipeline is shown as a trace in FIGURE 4. The various peaks in the trace correspond to places of exterior radioactivity which indicate the leaks in the pipeline. Radioactive markers may be positioned in known geographic locations along the length of the pipeline. When this is done the radioactivity emitted by such markers will also be recorded and the peaks corresponding to such markers can be used to define the location of the leak more accurately. The radioactive marker system of co-pending Serial No. 805,283, filed April 9, 1959, provides a satisfactory method.

Since the amount of radioactive liquid which leaks to the outside of the pipeline will depend upon the size of the hole in the line, the recorded radioactivity level will provide an indication of the size of the leak. After calibration, the level of recorded radioactivity can be expressed in the recording equipment in terms of cubic feet of gas leaked per minute or other suitable volumetric-rate expression.

Rather than using the wash liquids to sweep away radioactive material clinging to the interior wall of the pipeline, gas may be flowed through the line to volatilize the radioactive material (especially if the latter is low boiling). The invention may also be practiced by using other embodiments which maintain the liquid containing radioactive material in contact with the entire interior circumference of the pipeline, e.g., as a piston-like slug which is forced through the line by the pressure of flowing gas.

What is claimed is:

1. A method for detecting and locating leaks in gas-carrying pipeline which comprises providing in said pipeline a liquid containing small amounts of radioactive material, maintaining said liquid as a piston-like radioactive slug by means of and between pipeline pigs having sealing means for preventing the substantial bypass of liquid therearound, moving said pipeline pigs and piston-like radioactive slug of liquid through the pipeline by gas flowing under pressure within the line, causing portions of the radioactive slug to leak into the ground adjacent the pipeline by passage through leak holes in the line and thereby forming zones of radioactivity exterior of the pipeline and adjacent the leaks therein, passing by means of gas flowing under pressure within the pipeline a radioactive detection and recording means along the same path traveled by the radioactive liquid slug, and detecting and recording in a manner relatable to distance along the pipeline radioactivity exterior of the pipeline caused by the leaked radioactive slug.

2. A method for detecting and locating leaks in a gas-carrying pipeline which comprises discontinuing the flow of gas in a section of pipeline; positioning in said section at least two pipeline pigs provided with sealing means which prevent the substantial passage of liquid past said pipeline pigs; maintaining the length of pipeline between said pipeline pigs filled with a liquid containing small amounts of radioactive material; positioning behind said two pipeline pigs a third pipeline pig adapted to detect and record radioactivity exterior of the pipeline; flowing gas under pressure through said pipeline and thereby causing all of said pipeline pigs to travel through the pipeline; causing portions of the radioactive liquid slug formed between said first and said second pipeline pigs to leak into the ground adjacent the pipeline by passage through leak holes in the pipeline and thereby forming zones of radioactivity exterior of the pipeline and adjacent the leaks therein, and detecting and recording, by means of equipment associated with said third pipeline pig, in a manner relatable to distance along the pipeline radioactivity exterior of the pipeline caused by the leaked radioactive slug.

3. A method for detecting and locating leaks in a gas-carrying pipeline which comprises introducing into said pipeline a liquid containing small amounts of radioactive material and forming therein a radioactive liquid slug in contact with the entire inner circumference of the pipeline, moving the radioactive slug through said pipeline by means of gas flowing under pressure in the line, causing portions of the radioactive liquid slug to leak into the ground adjacent the pipeline by passage through leak holes in the pipeline and thereby forming zones of radioactivity exterior of the pipeline and adjacent the leaks therein, introducing and passing by means of gas flowing under pressure within the pipeline a radioactivity detection and recording means along the same path traveled by the radioactive liquid slug, and detecting and recording in a manner relatable to distance along the pipeline radioactivity exterior of the pipeline caused by the leaked radioactive liquid slug.

4. A method for detecting and locating leaks in gas-carrying pipeline which comprises providing in said pipeline a liquid containing small amounts of radioactive material, maintaining said liquid as a piston-like radioactive slug by means of and between pipeline pigs having sealing means for preventing the substantial bypass of liquid therearound, moving said pipeline pigs and piston-like radioactive slug of liquid through the pipeline by gas flowing under pressure within the line, causing portions of the radioactive slug to leak into the ground adjacent the pipeline by passage through leak holes in the line and thereby forming zones of radioactivity exterior of the pipeline and adjacent the leaks therein, following the radioactive slug through the pipeline with a slug of originally nonradioactive liquid to wash off radioactive material clinging to the interior of the pipeline, said originally non-radioactive material being maintained as a piston-like slug by means of and between pipeline pigs having sealing means for preventing the substantial bypass of liquid therearound and being moved through the pipeline by gas flowing under pressure within the line, passing by means of gas flowing under pressure within the pipeline a radioactivity detection and recording means along the same path traveled by the radioactive liquid slug, and detecting and recording in a manner relatable to distance along the pipeline radioactivity exterior of the pipeline caused by the leaked radioactive slug.

References Cited in the file of this patent

UNITED STATES PATENTS

| 2,700,734 | Egan | Jan. 25, 1955 |
| 2,705,419 | Chawner | Apr. 5, 1955 |
| 2,749,444 | Shea | June 5, 1956 |
| 2,810,076 | Murdock | Oct. 15, 1957 |

OTHER REFERENCES

Application of Radioisotopes to Leakage and Hydraulic Problems, by Putman et al., International Conference on Peaceful Uses of Atomic Energy, United Nations Press, 1955, pages 147 to 150 (vol. 15).